United States Patent [19]

Rugg et al.

[11] 4,368,079

[45] Jan. 11, 1983

[54] APPARATUS FOR CHEMICAL CONVERSION OF MATERIALS AND PARTICULARLY THE CONVERSION OF CELLULOSE WASTE TO GLUCOSE

[75] Inventors: Barry A. Rugg, New York, N.Y.; Walter Brenner, Teaneck, N.J.

[73] Assignee: New York University, New York, N.Y.

[21] Appl. No.: 264,245

[22] Filed: May 18, 1981

Related U.S. Application Data

[62] Division of Ser. No. 131,340, Mar. 18, 1980, Pat. No. 4,316,747.

[51] Int. Cl.³ .............................. B01J 3/04; B01J 4/00
[52] U.S. Cl. .......................................... 127/1; 127/28; 366/88; 366/90; 422/137
[58] Field of Search ............... 127/1, 28, 37; 422/137; 366/83, 85, 88, 90; 162/56, 236; 425/204, 208

[56] References Cited

U.S. PATENT DOCUMENTS

| | | | |
|---|---|---|---|
| 2,048,286 | 7/1936 | Pease | 422/137 |
| 3,801,432 | 4/1974 | Free | 162/50 |
| 3,963,558 | 6/1976 | Skidmore | 366/558 |
| 3,998,688 | 12/1976 | Fischer et al. | 162/50 |
| 4,000,032 | 12/1976 | Bergstrom et al. | 162/50 |
| 4,214,947 | 7/1980 | Berger | 162/56 |

Primary Examiner—Michael S. Marcus
Attorney, Agent, or Firm—Felfe & Lynch

[57] ABSTRACT

A process and apparatus for the conversion of waste cellulose to glucose wherein an aqueous slurry of waste cellulose is acid hydrolyzed includes continuously feeding an aqueous slurry of waste cellulose into an inlet port with a twin screw extruder, continuously reacting the cellulose with water in the presence of an acid catalyst at elevated temperature and pressure in a reaction zone disposed in the extruder between the inlet port and an outlet port while continuously conveying same to the outlet port and at least quasi-continuously discharging the reacted cellulose from the extruder while maintaining the elevated temperature and pressure in the reaction zone by forming a dynamic seal zone at the upstream end of the reaction zone and valving the discharge downstream of the outlet port.

6 Claims, 7 Drawing Figures

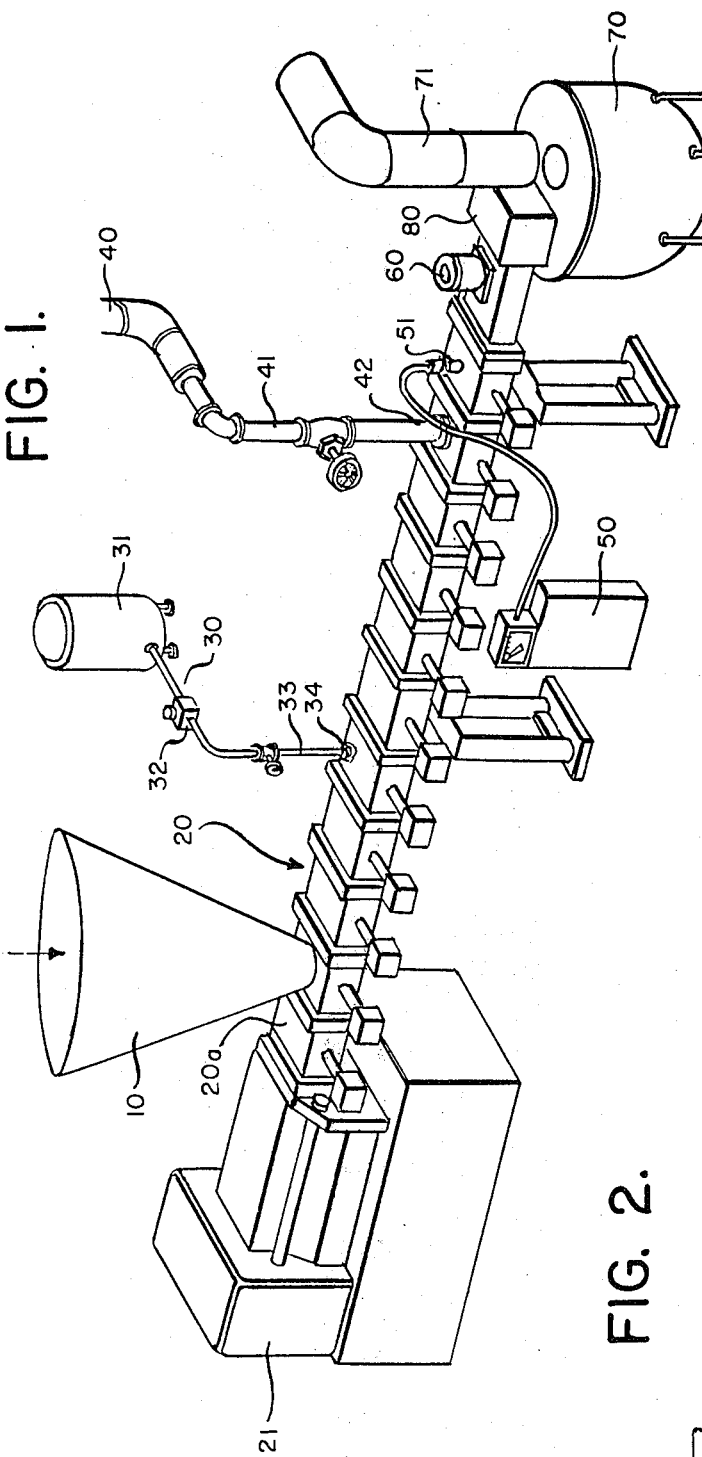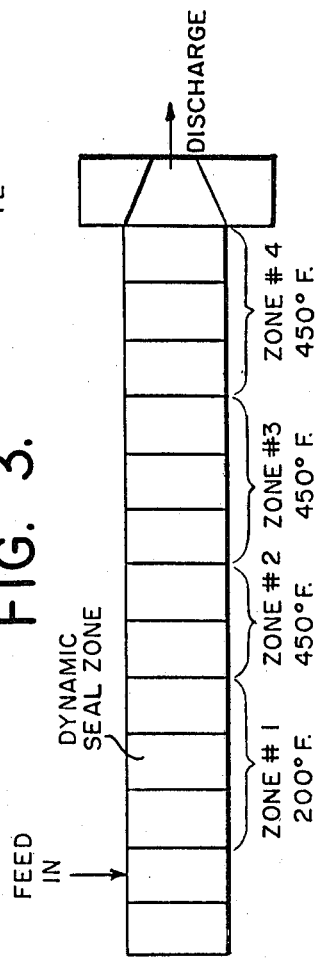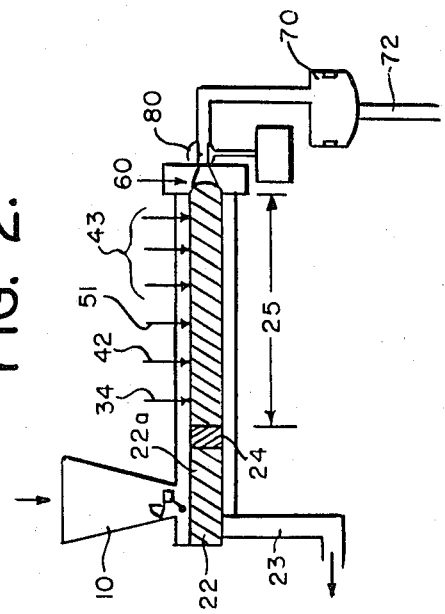

ALPHA-CELLULOSE TO GLUCOSE CONVERSION YIELD VS. ACID CONCENTRATION; NEWSPRINT PULP

APPARATUS FOR CHEMICAL CONVERSION OF MATERIALS AND PARTICULARLY THE CONVERSION OF CELLULOSE WASTE TO GLUCOSE

This is a division of application Ser. No. 131,340 filed Mar. 18, 1980 now U.S. Pat. No. 4,316,747 issued Feb. 23, 1982.

BACKGROUND OF THE INVENTION

The present invention relates to a process and an apparatus for the quasi-continuous or continuous chemical conversion of materials, and in particular to a process and an apparatus for the conversion of waste cellulose to glucose by acid hydrolyzation.

Acid hydrolysis of cellulose has been extensively studied for the better part of the century, particularly in connection with the manufacturing of ethanol from wood wastes. It has long been known that cellulose can be hydrolyzed in acid solutions and converted to its monomer, glucose, and the reaction has been experimentally investigated since this discovery. The reaction results from the fact that the monomers of cellulose are in anhydroglucose units, and that during hydrolyzation, a water ion is added to the cellulose monomer unit to obtain the heavier molecular weight glucose.

Recently, there has been a growing interest in the utilization of waste cellulose for energy production, because of the possibility of producing ethyl alcohol from glucose, and for the purposes of materials recovery.

While the acid hydrolysis of cellulose is heterogeneous, it can be regarded as a homogeneous reaction, provided that the cellulose reactant is dispersed in the form of fine particles, i.e., 200-mesh or less. The kinetically predicted sugar yields assume that the cellulose reactant has appropriate chemical reactivity for the acid hydrolysis. The technical problems of cellulose hydrolysis are to a great extend due to the fact that this is not the case. The lack of an adequate amount of chemical reactivity in cellulose is called lack of accessibility. This is related to the highly inert character and crystalline organization on a molecular level of the high molecular weight cellulose, and also the presence of lignin. Hydrogen-bonding almost certainly plays a very important role in the structure of cellulose, and may be a key factor in explaining its chemical inertness.

In general, mechanical treatments, such as, for example, intensive ball milling to sizes below 60 mesh, have been found to be technically effective, but at a high cost which renders any process economically prohibitive. Treatment with high-energy ionizing radiation on the order of 100 megarads has been shown to be effective, however the cost of such large doses of ionizing radiation is too high for industrial usage.

While heretofore successful batch-wise production of glucose from cellulose has been carried out by the acid hydrolysis of waste cellulose, this type of process and the apparatus for carrying it out are insufficient for commercial production.

SUMMARY OF THE INVENTION

It is the main object of the present invention to achieve a quasi continuous or continuous acid hydrolysis of fibrous material, in particular wastes cellulose, to obtain a derivative thereof, in particular glucose which can be then converted to ethanol.

By the term quasi continuous, it is meant that a process step is effected in such a cyclical or periodic manner so as to take on the resemblance of and sufficiently approximate a continuous process step so as to take on the attributes thereof and be considered continuous by any further process or apparatus elements downstream thereof.

The process and apparatus for the conversion of fibrous material to a derivative thereof and in particular for the continuous acid hydrolysis of cellulose to glucose, is based primarily upon the novel hydrolysis reactor according to the present invention which is capable of feeding, conveying and discharging hydrolyzable cellulosic materials continuously while maintaining appropriate temperatures and/or pressures in the reaction zone thereof. Because this hydrolysis requires exposure of the reactor components to dilute acids at high temperatures and pressures, all materials of construction are advantageously resistent to corrosion especially in the reaction zone.

According to the present invention, the hydrolysis reactor is a Werner and Pfleiderer ZDS-K 53 (53 mm) corotational two screw extruder which was selected because of its capacity for conveying, mixing and extruding the required amounts of cellulosic feedstock. The extruder allows accurate control of temperature, pressure, residence time, etc. as a result of the further novel features of the present invention as explained hereinafter. The extruder has the working elements of intermeshing twin screws which rotate in the same direction and which eliminate material build-up in the processing section and make feasible close control of residence time, etc., with intensive mixing.

For the quasi-continuous or continuous processing of materials, the reactor was coupled with an appropriate feeding mechanism for cellulose slurries and a discharge system for reacted material, while maintaining the necessary elevated pressure and/or temperature in the reaction zone. In particular, the feeding means included a steam jacketed crammer feeder also produced by the Werner & Pfeiderer Corp. so as to maximize throughput with preheating as required.

In a particularly advantageous embodiment of the present invention, hydropulped recycled newspaper feedstock is obtained in an aqueous slurry form approx. 10% solid content and is optionally irradiated with a dosage of 10 megarads. This pulp feedstock is then introduced into the reactor by means of a slurry pump and crammer feeder and the waste cellulose is then conveyed with heating by the twin screws into the reaction zone where the required amount of steam and acid is introduced. Hydrolysis then takes place at a predetermined temperature and pressure and the product is properly discharged.

In order to maintain the pressure in the reaction zone during the process, pressure is maintained at the inlet to prevent egress of the material through the crammer feeder by a dynamic seal in the form of a densified plug of material within the inlet zone of the reactor. Simultaneously, quasi continuous discharge of the hydrolyzed material is accomplished while maintaining the pressure by the use of a discharge system comprising a hydraulically powered actuator and a ball valve, in particular the Kamyr Intensive Service 2" ball valve.

The dynamic seal is achieved by the formation of a dynamic plug zone in the extruder, at the inlet end of the reaction zone. The dynamic seal may be formed in the conventional manner, by utilizing a left handed screw thread in the dynamic seal zone with right handed threads disposed downstream and upstream thereof.

In a particularly advantageous commercial embodiment of the present invention, as disclosed in copending application Ser. No. 131,339, filed on the same day as this application, the dynamic seal is effected by a plug formed by an unthreaded and radially recessed portion of the screws in the dynamic plug zone.

The discharge of the extruder can be effected in a fully continuous manner by use of the continuously open valve disclosed in more detail in said U.S. application Ser. No. 131,339, filed on the same day as this application in which the valve is continuously open in response to a preselected pressure in the reaction zone.

These and other objects of the present invention will become apparent from the detailed description of the invention when read with the attached drawings wherein:

BRIEF DESCRIPTION OF THE DRAWINGS

FIG. 1 is a prespective view of the apparatus according to the present invention:

FIG. 2 is a sectional schematic view of the apparatus according to the present invention;

FIG. 3 is a schematic representation of the heat zones in the apparatus of the present invention;

DETAILED DESCRIPTION OF THE INVENTION

Figure 4:
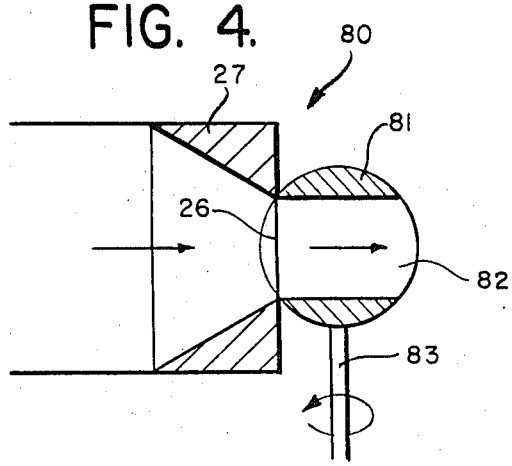
FIGS. 4 and 5 are sectional views of the discharge valve according to the present invention.

FIG. 1 shows the basic apparatus for carrying out the process according to the present invention. The apparatus includes the Werner & Pfleiderer ZDS-K 53 twin screw extruder 20 having two corotational screws therein driven by a motor 21. The housing 20a includes a feed inlet in which the material to be converted is received. As shown in FIG. 1, in accordance with the present invention a slurry of the fibrous pulp material is fed into the extruder 20 by means of a crammer feeder 10, which as shown in FIG. 2, has screw elements for cramming the material into the extruder to be conveyed thereby.

While in conjunction with the present invention, the input of the fibrous material, in particular cellulose paper pulp or sawdust is fed in in a slurry form, in an alternative form of the invention, the input may be in a dry state where water is added at other points as is explained in copending U.S. application Ser. No. 131,339 filed on the same day as this application.

The extruder 20 includes a reaction zone 25 which is bounded on its inlet side by a dynamic seal zone 24 and a discharge valve 80 at its outlet side. Upstream of the reaction zone is the inlet portion or preheating zone 22a of twin screws 22 wherein the fibrous input is first received and thereby conveyed into the reaction zone.

In accordance with the process of the present invention, when the fibrous material is received in a slurry, much of the water thereof is removed in the process of the conveyance of the slurry into the reaction zone and for this purpose a dewatering drain 23 is provided upstream of the dynamic seal. Where the fibrous material is fed in dry form, the dewatering drain is not necessary since the liquid added thereto is just sufficient to act as a carrier or, in the case of hydrolysis to act as the reactant and therefore no water is lost as in the case of a slurry input.

The apparatus further includes means 30 for adding an acid catalyst comprising a tank 31 and a metering pump 32 which feeds the acid along pipe 33 into the acid input port 34 for the extruder housing. The acid catalyst input port 34 is shown to be at the beginning of the reaction zone 25 so that the acid acts on the reactants during substantially the entire residence time of the reactants in the reaction zone. However, the input position of the acid catalyst port 34 can be varied, depending upon the temperature in the reaction zone. At higher temperatures, the reaction will generally take place faster and thus the acid can be introduced into the reaction zone at a position closer to the outlet thereof.

In the case of the hydrolysis of cellulose to glucose, it is especially advantageous for the reaction to take place at elevated temperatures and in order to bring this about in the most advantageous manner, steam is added to add energy to the reaction zone to obtain a quick increase in temperature. For this, steam supply means 40 are provided including steam pipe 41 and steam input port 42. The steam may also be used as a supply of water for the hydrolysis cellulose upon its condensation in the reaction zone.

It should also be noted that where the fibrous material is input into the extruder in a dry form, water may be added in the preheating zone before the dynamic seal 24 and with the acid through acid input port 34.

Also provided along the extruder housing is a pressure indicator port 51 which in conjunction with pressure indicator means 50 enables a monitoring of the elevated pressure within the reaction zone. Moreover, temperature input ports 43 are also provided to enable monitoring of the temperature within the various zones of the extruder assembly. These zones are set forth in FIG. 3 as zones 1–4 and show a typical thermal configuration of the apparatus during use.

Further, at the outlet end of the reaction zone 25, a pressure release valve 60 is provided to provide pressure relief when the pressure within the reaction zone exceeds acceptable limits.

The quasi continuous or continuous discharge of the reactants from the extruder is effected by the discharge valve means 80 which discharges the reactants into the collection vessel 70 which has a gas vent 71 and a flushing drain 72.

Figure 5:
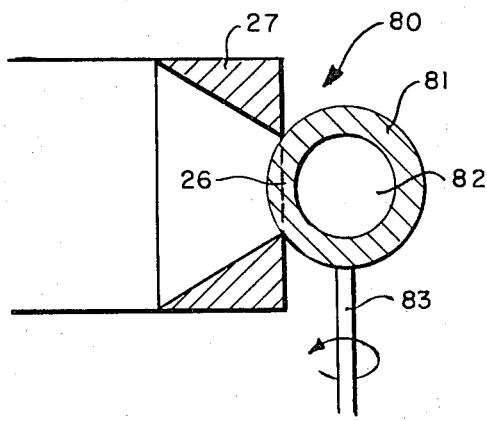

Turning to FIGS. 4–5, the discharge valve means 80 of the present invention will be discussed in more detail. According to the present invention, the discharge is brought about in a quasi-continuous manner by the use of a hyraulic actuated ball valve, which in the present invention is most advantageously a two inch Kamyr ball valve which has a 1.5" bore for heavy duty service. The ball 81 having the 1.5" bore 82 is rotatable on a shaft 83 which is hydraulically movable in a conventional manner. The ball 81 is situated at the outlet of the extruder which has means including flange 27 for defining a valve aperture 26 which is coactive with the bore 82 to effect the quasi-continuous discharge of the reactants.

FIG. 4 illustrates the situation where the valve means 80 is fully opened, that is, the bore 82 is fully aligned with aperture 26. FIG. 5 shows the valving means 80 in the fully closed position, that is, with bore 82 90° out of phase with the aperture 26. The ball in the case of the Kramyr ball valve, rotates 180° every 20 seconds taking 0.25 seconds to rotate. The valve is in the fully opened position about 10% of the time and thus for about 0.025 seconds.

As is described in the copending application Ser. No. 131,339 and filed on the same day as this application, the valving means 80 can be a continuously open valve which enables the discharge to flow continuously from the extruder as desired.

Figure 6:
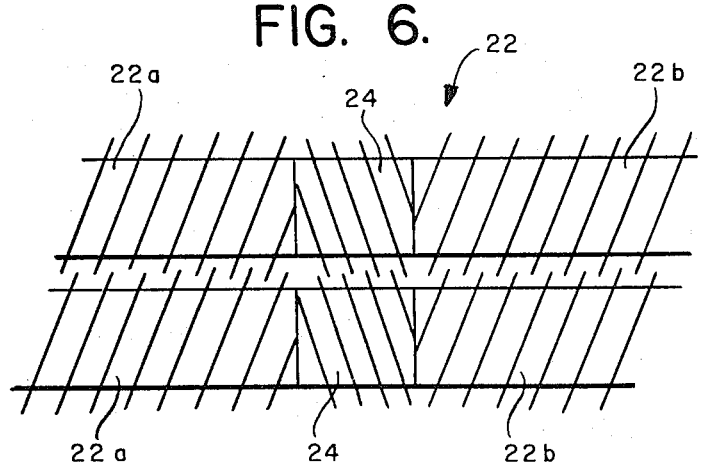
FIG. 6 is a schematic representation of the means forming the dynamic seal according to the present invention.

Referring now to FIG. 6, the means forming the dynamic seal 24 is discussed in greater detail. As shown therein, the dynamic seal according to the present invention is formed by providing left handed threads 24 in the area of the dynamic seal zone with right handed threads upstream thereof at screw area 22a and downstream thereof in screw area 22b. The left handed screw threads 24 act to form a dynamic plug which seals the reaction zone and prevents gases from escaping while continuously conveying the input into the reaction zone.

The dynamic seal may also be formed in a novel manner in accordance with the disclosure of copending application Ser. No. 131,339 filed on the same day as this application wherein an unthreaded radially recessed screw section is used as described therein.

The dynamic seal, in conjunction with the valve means 80, maintains the elevated pressure and, where desirable, the elevated temperature in the reaction zone while enabling the screw elements to convey the fed in material into the reaction zone and out of the reaction zone and to enable the reaction process to take place therein.

An example of the process and apparatus of the present invention with respect to the conversion of cellulose to glucose is set forth hereinafter as follows:

EXAMPLE

Feed Material: paper pulp in a 10% aqueous slurry
Feed Rate: 300 pounds per hour wet
Reaction Temperature 400° F.
Reaction Pressure 250 psi
Acid ($H_2SO_4$): 1.8% by weight (100 pounds per hour acid solution).
Dewatering 245 pounds per hour at 2% solids with 5 pounds per hour solids input.
  Machine Screw RPM 100 RPM, drive torque 60%.
  Crammer Feeder: 10%, drive torque 60%
  Glucose conversion: 40% based on available cellulose
  Reaction zone input: 25 pounds per hour solid, 30 pounds per hour water, 100 pounds per hour acid solution.
  Product output: 20% solids including 6 pounds per hour glucose, 9 pounds per hour cellulose, 5 pounds per hour lignin, 5 pounds per hour hemi cellulose or decomposed products, 100 pounds per hour water.
  Screw configuration: total length 2250 mm, preplug feed zone 630 mm of 30 mm pitch elements conveying material 30 mm forward per revolution.
  Plug zone: 30 mm long with 90 mm left hand pitch
  Reaction zone: 1590 mm long with 45 mm pitch stainless steel elements.
  Thermal configuration: As shown in FIG. 3
  Discharge valve 2" Kamyr ball valve with 1½" bore 20 sec. cycle at 0.25 seconds per 180° cycle.

In accordance with the present invention, the process parameters of the invention can vary within a wide degree as is set forth hereinafter.

The feed material for wet feeds, can have a consistency of 5% to 50% slurry with a limited viscosity and any cellulose containing material such as paper pulp, wood pulp, waste pulp, pulped municipal solid waste etc. can be used.

The feed rate can vary from 100 pounds per hour to 900 pounds per hour depending upon the consistency of the feed material and the RPM of the screw elements.

The reaction temperature can vary from 350° F. to 545° F. at 1000 psi, and may also be higher depending upon the available steam pressure and the ability to discharge quickly. Alternate energy transfer modes are possible such as superheated steam or water or direct heat.

The reaction pressure can vary from 135 to 1000 psi or higher depending upon the available steam pressure and the ability to discharge quickly.

The acid concentration for the process can be from 0 to 10% acid injection at rates of from 0 to 300 pounds per hour. Alternative acids for producing derivatives of fibrous materials such as cellulose can be HCL, $HNO_3$, organic acids, $SO_2$ gas, etc.

The dewatering varies with the screw speed and the crammer speed, as well as the screw configuration. It may vary from 80 pounds per hour at 100 pounds per hour feed up to 720 pounds per hour at a 900 pounds per hour feed. The solids in the dewater outlet vary from 0.05% to 5%.

The screw machine RPM can vary from 40 RPM to 300 RPM with the given screw converter and the crammer feeder can operate from 8% to 100%. The torque varies from 20% to 100% resulting from the screw RPM, the crammer rate, the consistency of feed, the screw configuration, the temperature profile, rate of acid injection, conversion rate and discharge rate.

The glucose conversion depends on all of the parameters noted above such as residence time, acid concentration, temperature, mixing which all depend on the machine parameters and can vary from 5% to 90% of the theoretical conversion maximum.

The composition in the reaction zone will vary with the feed and the product composition also varies with the feed and the reaction conditions.

With respect to the screw configuration, the forward conveying preheating zone 22a can be any combination of right handed elements up to 2000 mm in length with 30, 45, 60 or 90 mm pitch elements. Also included therein can be mixing, pulverizing, kneading, etc. elements to provide a homogeneous material to the dynamic seal zone 25. The dynamic seal zone which forms the dynamic plug can be from 15 to 360 mm and comprises 30, 45, 60 or 90 mm lefthanded pitch elements.

The screw configuration in the reaction zone comprises the righthanded forward conveying elements which is up to 2000 mm in length and includes 30, 45, 60 or 90 mm pitch right handed elements.

The thermal configuation is such that all of the zones 2-4 are interchangable and can vary in length from 1 to 3 barrel sections. The preheating zone temperature can vary from 32° to 212° F. and the reaction zone temperature can vary from 350° to 545° F.

The discharge parameters result from variations in the hydraulic or pneumatic pressure and flow rate results in the valve speed and varies from 0.1 seconds at 1000 psi with unrestricted flow to several seconds for restricted flow. The cycle rate is controlled by a preset timer which signals a solenoid actuating the ball valve from 2 seconds to one minute for the cycle time.

Moreover, several pretreatments for the waste feed stock, in particular for newspaper, can be used to improve the cellulose to glucose conversion yield. The most effective pretreatment found was hydropulping and irradiation. The irradiations are carried out at ambient temperatures and in the presence of air with an electron beam accelerator. Irradiation dosages ranging from 5 to 50 megarads can be used and the 10 megarad dosage has been found to be the most commercially effective. In a particularly simple embodiment, slurries of hydropulped waste newspapers replaced in polyethylene bags and the bags were heat sealed, each bag containing about 20 pounds of hydropulped waste newspaper slurry of known concentration. The bags were then replaced on a conveyor that moved past the beam of an electron beam accelerator and a dosage of 5 megarads per pass was produced thereon.

Figure 7:
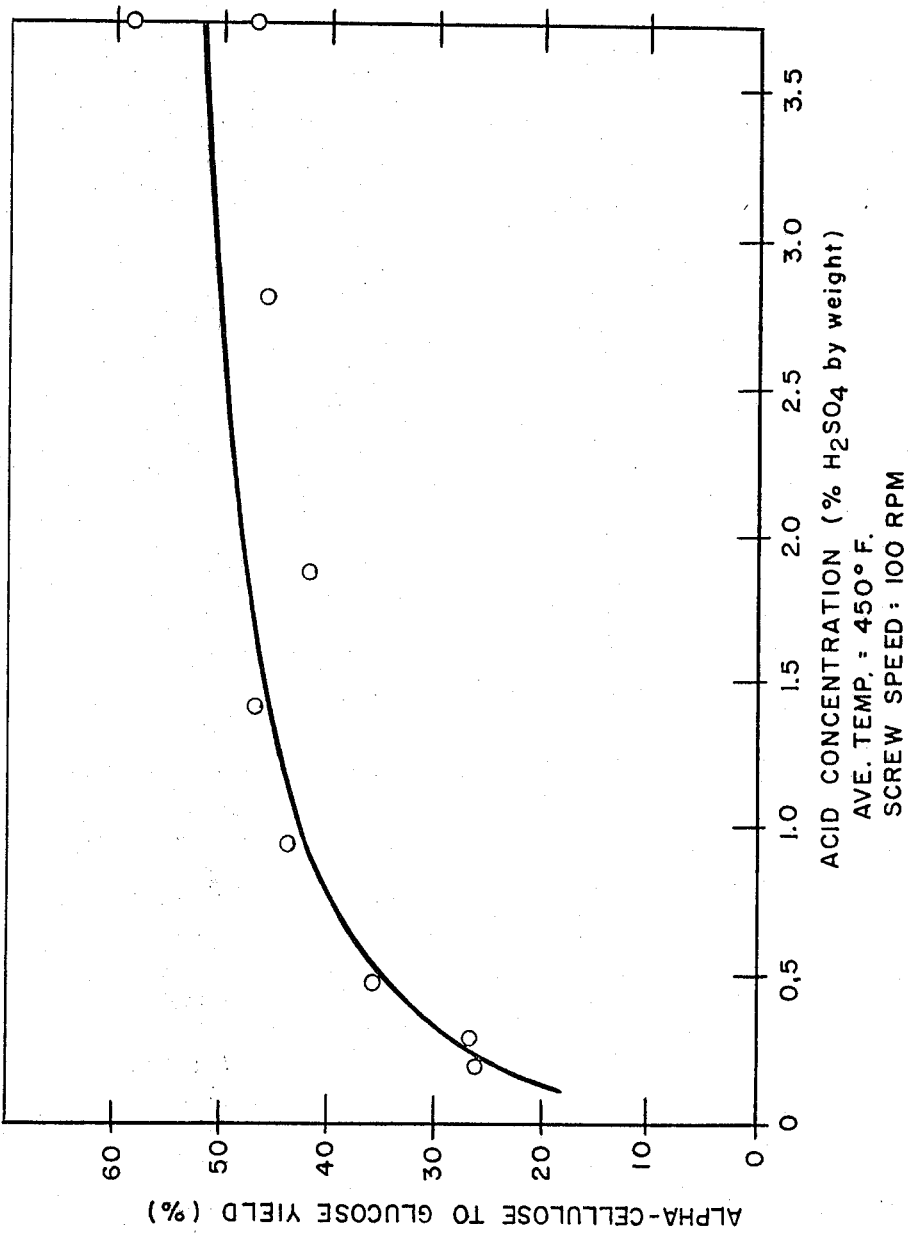
FIG. 7 is a graph of yield data for process variations according to the invention.

FIG. 7 illustrates the results obtained with various process parameters of the present invention.

It will be clear to those skilled in the art that the process and apparatus of the present invention can be adapted for use in obtaining other derivatives of cellulose as well as derivatives of other fibrous materials. For example, lignins can be extracted from cellulose by contacting a lignocellulosic slurry or pulp with calcium bisulfite liquor (1% CaO, 4% $SO_2$) @ a pH of 9.8 injected into the reaction zone and at a temperature of 180°-200° C. by way of the injection of steam into the reaction zone. A highly sulfonated lignosulfonic acid is formed rapidly which is water soluble and can be extracted from the cellulose. Lignosulfonates can be used as binders, etc. for various applications.

It will be appreciated that the instant specification and example are set forth by way of illustration and not limitation, and that various modifications and changes may be made without departing from the spirit and scope of the present invention.

What is claimed is:

1. An apparatus for the conversion of waste cellulose to glucose by dilute acid hydrolysation, comprising: extruding means including a housing having an inlet port receptive of cellulose to be converted, an outlet port, a reaction zone therebetween and twin corotational screws for continuously conveying the cellulose through the reaction zone and to the outlet port; means for continuously injecting dilute sulfuric acid into the reaction zone; means for producing an elevated temperature and pressure within the reaction zone including means for continuously injecting steam or superheated water at elevated pressure into the reaction zone; means for continuously feeding the cellulose to the inlet port; means for at least quasi-continuously discharging the reacted cellulose from the extruding means while maintaining the elevated temperature and pressure within the reaction zone including means for forming a dynamic seal at the upstream end of the reaction zone; valve means disposed downstream of the outlet port for controlling the discharge; and means for cyclically activating said valve means.

2. The apparatus according to claim 1, wherein the hydrolyzing means further comprises means for pretreating the aqueous slurry before being received by the feeding means including means for irradiating the aqueous slurry.

3. The apparatus according to claim 1, wherein the means forming the dynamic seal comprises a portion of the screws having a left hand pitch thread and a right hand pitch thread upstream thereof and downstream thereof in the reaction zone.

4. The apparatus according to claim 1 or claim 3, wherein the valve means comprises a hydraulically activated ball valve.

5. The apparatus according to claim 4, wherein the means for continuously feeding comprises means for continuously removing excess liquid upstream of the reaction zone.

6. The apparatus according to claim 5, wherein the means for continuously feeding comprises means for cram feeding the aqueous slurry into the inlet port.

* * * * *

UNITED STATES PATENT AND TRADEMARK OFFICE
CERTIFICATE OF CORRECTION

PATENT NO. : 4,368,079
DATED : May 18, 1981
INVENTOR(S) : Barry Rugg et al.

It is certified that error appears in the above-identified patent and that said Letters Patent are hereby corrected as shown below:

Column 1, line 6, insert the following paragraph:

-- The invention described herein was made in the course of work under U.S. Environmental Protection Agency Grant No. R 805,239 and is subject to an exclusive license left to the grantee, New York University of New York, New York. --.

Signed and Sealed this

Fifth Day of June 1984

[SEAL]

Attest:

GERALD J. MOSSINGHOFF

Attesting Officer      Commissioner of Patents and Trademarks